US009369906B2

(12) United States Patent
Muttik

(10) Patent No.: US 9,369,906 B2
(45) Date of Patent: Jun. 14, 2016

(54) OPTIMIZING COMMUNICATION FOR MOBILE AND EMBEDDED DEVICES

(71) Applicant: Igor Muttik, Hertfordshire (GB)

(72) Inventor: Igor Muttik, Hertfordshire (GB)

(73) Assignee: McAfee, Inc., Santa Clara, CA (US)

( * ) Notice: Subject to any disclaimer, the term of this patent is extended or adjusted under 35 U.S.C. 154(b) by 105 days.

(21) Appl. No.: 14/128,424

(22) PCT Filed: Sep. 20, 2013

(86) PCT No.: PCT/US2013/060895
§ 371 (c)(1),
(2) Date: Dec. 20, 2013

(87) PCT Pub. No.: WO2015/041674
PCT Pub. Date: Mar. 26, 2015

(65) Prior Publication Data
US 2015/0257026 A1    Sep. 10, 2015

(51) Int. Cl.
| | |
|---|---|
| H04W 24/10 | (2009.01) |
| H04W 28/02 | (2009.01) |
| H04W 28/06 | (2009.01) |
| H04W 72/12 | (2009.01) |
| H04L 12/851 | (2013.01) |
| H04W 24/02 | (2009.01) |
| H04L 12/807 | (2013.01) |
| H04W 28/10 | (2009.01) |
| H04W 88/08 | (2009.01) |

(52) U.S. Cl.
CPC .............. *H04W 24/10* (2013.01); *H04L 47/24* (2013.01); *H04L 47/27* (2013.01); *H04W 24/02* (2013.01); *H04W 28/0226* (2013.01); *H04W 28/0236* (2013.01); *H04W 28/06* (2013.01); *H04W 28/10* (2013.01); *H04W 72/1242* (2013.01); *H04W 88/08* (2013.01)

(58) Field of Classification Search
None
See application file for complete search history.

(56) References Cited

U.S. PATENT DOCUMENTS

| 7,355,997 B2 * | 4/2008 | Qian et al. ............... 370/328 |
| 2002/0186675 A1 * | 12/2002 | Otting et al. ............. 370/337 |
| 2004/0102158 A1 | 5/2004 | Schwarz et al. |

(Continued)

FOREIGN PATENT DOCUMENTS

KR    10-2009-0088114 A    8/2009

OTHER PUBLICATIONS

International Search Report and Written Opinion regarding corresponding PCT Application No. PCT/US2013/060895, dated May 30, 2014.

*Primary Examiner* — Ian N Moore
*Assistant Examiner* — Justin T Van Roie
(74) *Attorney, Agent, or Firm* — Blank Rome LLP

(57) ABSTRACT

This disclosure relates generally to systems, apparatuses, methods, and computer readable media for optimizing communications for mobile and embedded devices. More particularly, but not by way of limitation, this disclosure relates to systems, apparatuses, methods, and computer readable media to permit mobile devices, e.g., smartphones, tablets, ultrabooks, and the like, which may frequently suffer from intermittent Internet connectivity, e.g., as their owners move around between access points, to estimate the duration of the remaining "window of opportunity" for data transmissions and then select and/or tailor data transmissions to be able to complete as much of the desired data transfer as possible before the expected connectivity loss. In some embodiments, signal strength over time may be analyzed and correlated with a history of connectivity for a particular user and/or device in order to improve the estimation of the remaining "window of opportunity" for data transmission.

20 Claims, 6 Drawing Sheets

(56) References Cited

U.S. PATENT DOCUMENTS

| | | | |
|---|---|---|---|
| 2005/0201403 A1* | 9/2005 | Wang | 370/412 |
| 2005/0249157 A1 | 11/2005 | Qian et al. | |
| 2011/0179336 A1 | 7/2011 | Gesbert et al. | |
| 2012/0236719 A1* | 9/2012 | Kikuzuki et al. | 370/235 |
| 2012/0296384 A1* | 11/2012 | Daynes et al. | 607/5 |
| 2013/0115888 A1 | 5/2013 | Tipton et al. | |
| 2014/0105035 A1* | 4/2014 | Lam et al. | 370/252 |
| 2014/0106801 A1* | 4/2014 | Tamizhmani et al. | 455/501 |

* cited by examiner

OPTIMIZING COMMUNICATION FOR MOBILE AND EMBEDDED DEVICES

TECHNICAL FIELD

This disclosure relates generally to systems, methods, and computer readable media for optimizing communications for mobile and embedded devices. More particularly, but not by way of limitation, this disclosure relates to systems, methods, and computer readable media to permit mobile devices, e.g., smartphones, tablets, ultrabooks, and the like. which may frequently suffer from intermittent Internet connectivity, e.g., as their owners move around between access points, to estimate the duration of the remaining "window of opportunity" for data transmissions and then select and/or tailor data transmissions to be able to complete as much of the desired data transfer as possible before the expected connectivity loss occurs.

BACKGROUND

Data transmission systems typically assume that data transfer will take place in a "connected" environment, that is, the expected connectivities of the recipient and sender are effectively assumed to be perpetual. This way of thinking may be a relic of past "hard-wired" communications systems, wherein the connectivity between two nodes in a network could be reliably assumed. In today's world, where so much communication takes place over mobile networks and/or between "smart," i.e., Internet-enabled, devices making up the so-called "Internet of Things," perpetual connectivity during a data transmission is no longer a safe assumption. In particular, wireless Internet signal strength can vary, devices can move into and out of the range of wireless access points at varying rates of speed, and devices can jump onto and off of different types of networks, such as Wi-Fi, 3G, 4G, etc., without warning.

In one embodiment, devices referred to herein as "data mules," which are devices that deliver or receive data, may be used to gather or send data from or to an embedded device over a temporary connection. Data nulling may be done by mobile devices and/or embedded devices. An example of an embedded device that a data mule may want to gather information from would be a "smart" water meter. Such a water meter may want to dump some information whenever there is a data mule, e.g., a person with a mobile phone, around that it may be able form a data connection with. However, this data connection is often only a temporary connection. In fact, if the data mule is moving as it passes the embedded device, this connection can be very temporary indeed. Thus, it is desirable to determine a way to send and/or receive as much information as possible into the limited time frame "window of opportunity" that exists for data transmission.

To achieve these aims, according to some embodiments, the instantaneous quality of signal strength may be measured. If the device(s) measuring the quality of signal strength senses that the quality of signal is diminishing, it could then adjust the size of the transmission packets so that the greatest possible amount of data packets are fit into the remaining time "window of opportunity" that is predicted to be available to the device.

According to some embodiments, it may be assumed that a drop in signal strength is associated with device movement. By assuming or ascertaining the speed of the data mule (in the scenario where a data mule is moving past a stationary embedded device that it is attempting to receive data from), the rate of signal drop and the time at which the signal disconnect will occur may be predicted. This may prove to be valuable due to the fact that, if a device attempts to transmit a large package that will not fit into the remaining "window of opportunity," i.e., connectivity timeframe, the entire data transmission may not succeed.

Even if a connection is quickly restored (e.g., if the device reconnects to a 3G/4G network), the original communication may be lost and would need to be repeated. This creates unnecessary duplication of network transmissions, which is undesirable from a user-experience point of view (e.g., delay and unnecessary battery drain) and financially (unnecessary costs for sending duplicated data).

If an interruption occurs during the submission of security telemetry, for instance, it may be especially undesirable, as the device may be attempting to contribute to a global threat intelligence (GTI) data pool at a back end server or attempting to verify the identity of a user attempting to gain access to a particular real-world place or piece of information.

Thus, according, to some embodiments, the transmission may be broken down into smaller portions so that the likelihood of losing a transmission is minimized and, if some data is lost, it will likely be only a small amount. Device sensors, e.g., GPS sensors, accelerometers, or pyrometers, may be used in order to tell how fast the device is moving. Device movement information may further aid in the estimation of the available connectivity time frame and subsequent adjustment of the communication packets so that the communication is less likely to break in the middle of a data transmission, thus discarding the entire transmission.

Breaking communications down into small portions (e.g., packets), however, has an additional transmission cost, as each packet introduces certain overhead (e.g., packet headers and computations associated with processing more headers and packets, as well as reassembling the original transmission from multiple packets), thus, breaking all transmissions down into small portions without first assessing the size of the remaining time "window of opportunity" is a sub-optimal approach.

The subject matter of the present disclosure is directed to overcoming, or at least reducing the effects of, one or more of the problems set forth above. To address these and other issues, techniques that, in part, reduce the likelihood of a connectivity interruption during an ongoing transmission (both downloads and uploads) are described herein.

DETAILED DESCRIPTION

Disclosed are systems, computer readable media, and methods of optimizing communications for mobile and embedded devices. By monitoring the signal strength for available connections (e.g.,. mobile, Wi-Fi, Bluetooth, or any other connection type), such systems, computer readable media, and methods may predict the timeframe before an Internet connection is likely to be lost. According to some embodiments, a primary factor in such predictions may be the rate at which the signal is dropping. Other embodiments may consider farther factors such as a user and/or device's historical connectivity information. The duration of the remaining "window of opportunity" may then be estimated, and transmissions may be selected and/or tailored to complete before the expected connectivity loss. Such systems, computer readable media, and methods may therefore be used to diminish the likelihood that a transmission is interrupted midstream due to connectivity losses, and thus decrease the number of failed transmissions within a communications system. With reference to the figures, embodiments of communication optimization schemes according to this disclosure are provided below.

Figure 1:
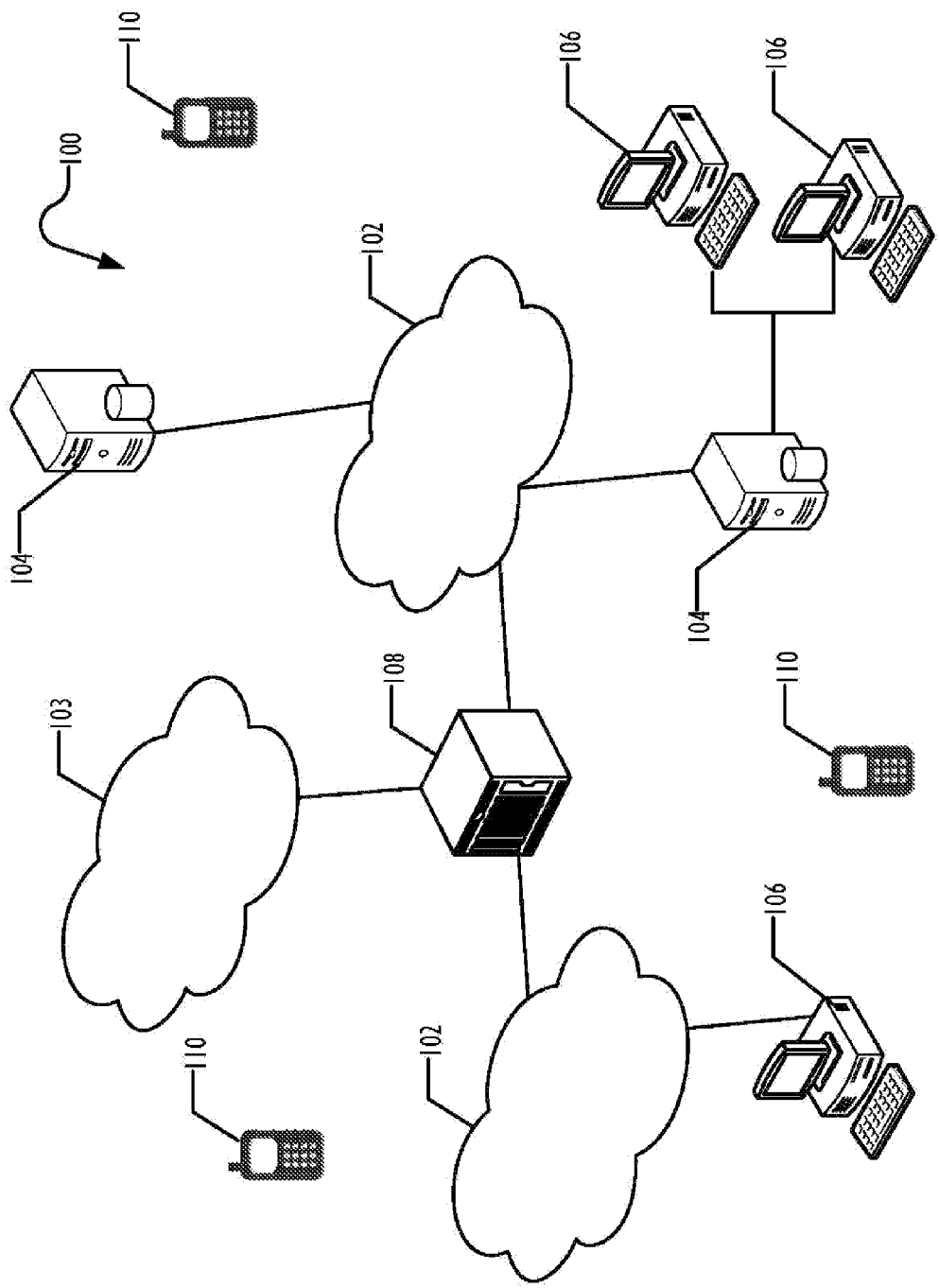
FIG. 1 is a block diagram illustrating network architecture infrastructure 100 according to one or more disclosed embodiments.

Referring now to FIG. 1, infrastructure 100 is shown schematically. Infrastructure 100 contains computer networks 102. Computer networks 102 include many different types of computer networks available today, such as the Internet, a corporate network, or a Local Area Network (LAN). Each of these networks can contain wired or wireless devices and operate using any number of network protocols (e.g., TCP/IP). Networks 102 are connected to gateways and routers (represented by 108), end user computers 106 and computer servers 104. Also shown in infrastructure 100 is cellular network 103 for use with mobile communication devices. As is known in the art, mobile cellular networks support mobile phones and many other types of devices (e.g., tablet computers not shown). Mobile devices in the infrastructure 100 are illustrated as mobile phones 110.

In a network such as that displayed in FIG. 1, communications optimization software may be deployed to manage and control communications between the devices on the network. This software could be used to, e.g., record signal strength and time for a particular device in a connectivity history store, compute instantaneous rates of signal loss, estimate remaining time windows for transmitting information, and select suitably-sized data to complete transmissions before connectivity is lost. This software may also be used to prioritize data records during data transmission. As noted above, such devices may frequently cone into and out of communication with computer networks 102 as the devices and/or user's carrying such devices move around.

Figure 2A:
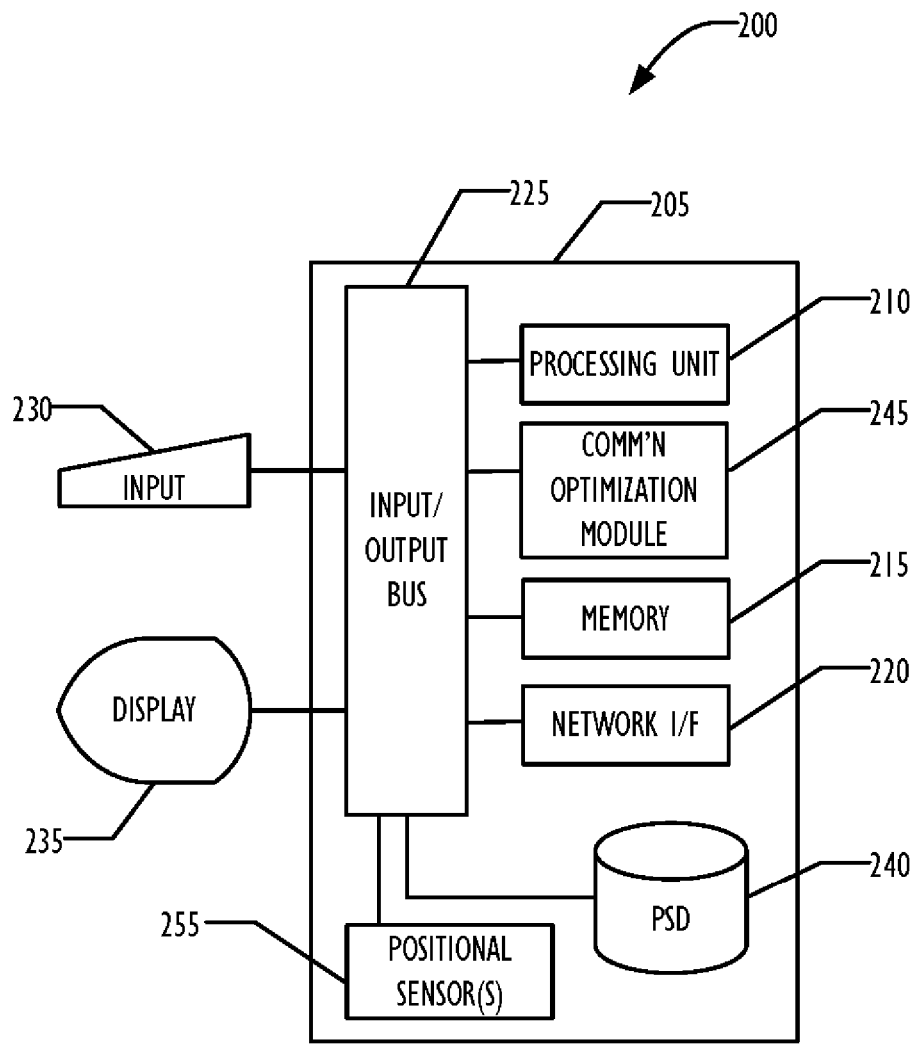
FIG. 2A is a block diagram illustrating a computer which could be used to execute the communication optimization approaches described herein according to one or more of disclosed embodiments.

Referring now to FIG. 2A, an example processing device 200 for use in providing communication optimization techniques according to one embodiment is illustrated in block diagram form. Processing device 200 may serve as processor in a mobile phone 110, gateway or router 108, client computer 106, or a server computer 104. Example processing device 200 comprises a system unit 205 which may be optionally connected to an input device 230 (e.g., keyboard, mouse, touch screen, etc.) and display 235. A program storage device (PSD) 240 (sometimes referred to as a hard disk, flash memory, or non-transitory computer readable medium) is included with the system unit 205. Also included with system unit 205 is a network interface 220 for communication via a network (either cellular or computer) with other mobile and/or embedded devices (not shown). Network interface 220 may be included within system unit 205 or be external to system unit 205. In either case, system unit 205 will be communicatively coupled to network interface 220. Program storage device 240 represents any form of non-volatile storage including, but not limited to, all forms of optical and magnetic memory, including solid-state, storage elements, including removable media, and may be included within system unit 205 or be external to system unit 205. Program storage device 240 may be used for storage of software to control system unit 205, data for use by the processing device 200, or both.

System unit 205 may be programmed to perform methods in accordance with this disclosure. System unit 205 comprises one or more processing units 210, input-output (I/O) bus 225 and memory 215. Access to memory 215 may be accomplished using the communication bus 225. Processing unit 210 may include any programmable controller device including, for example, a mainframe processor, a mobile phone processor, or, as examples, one or more members of the INTEL® ATOM™, and INTEL® CORE™ processor families from Intel Corporation and the Cortex and ARM processor families from ARM. (INTEL, INTEL ATOM, CORE, PENTIUM, and CELERON are trademarks of the Intel Corporation. CORTEX is a registered trademark of the ARM Limited Corporation. ARM is a registered trademark of the ARM Limited Company). Memory 215 may include one or more memory modules and comprise random access memory (RAM), read only memory (ROM), programmable read only memory (PROM), programmable read-write memory, and solid-state memory. As also shown in FIG. 2A, system unit 205 may also include a communication optimization module 245, which may be implemented in firmware to aid in the performance of the communication optimization techniques described herein. System unit 205 may also include one or more positional sensors 255, which may comprise an accelerometer, gyrometer, global positioning system (UPS) device, or the like, and which may be used to confirm or deny measured rates of signal strength loss, as is described further herein.

Figure 2B:
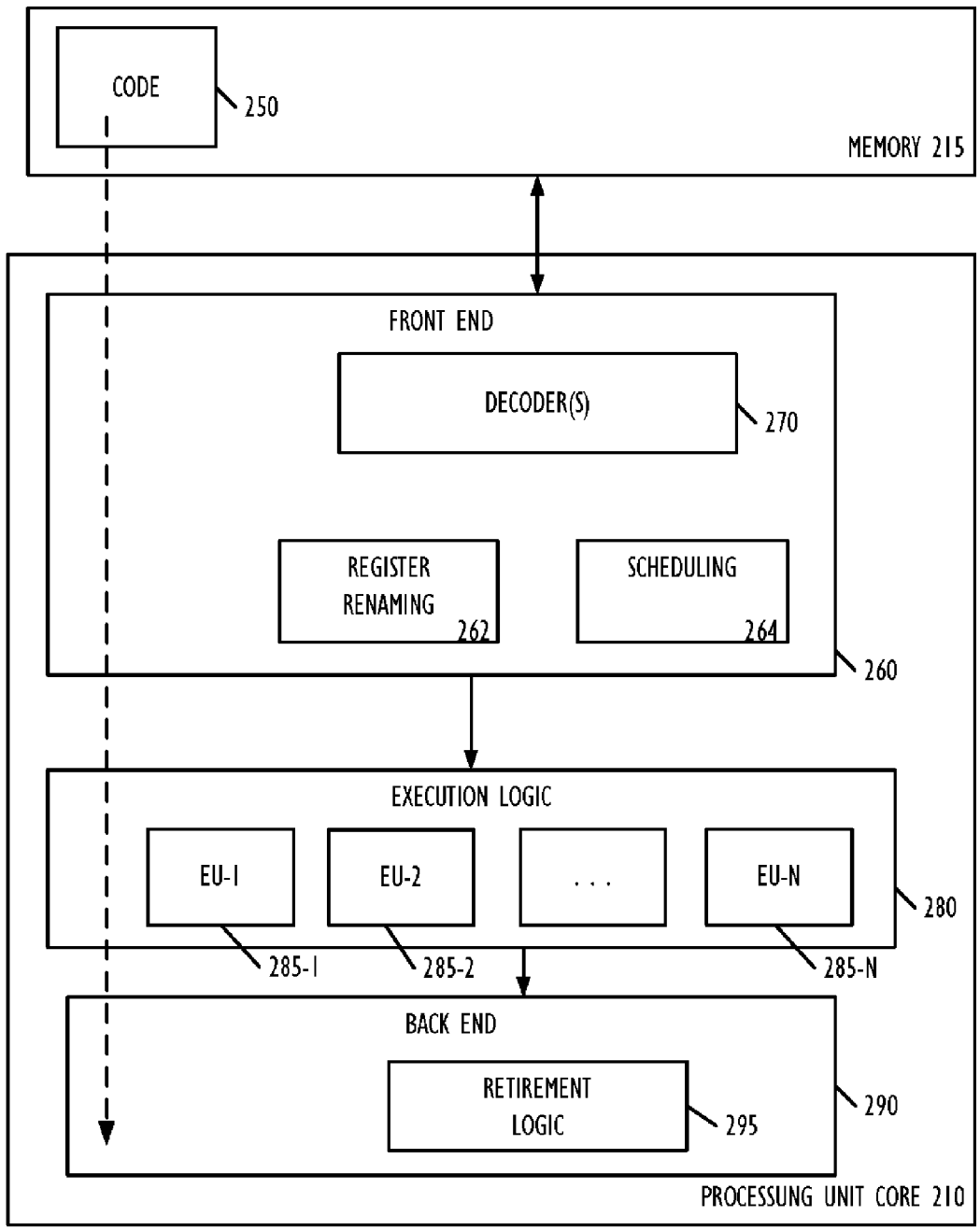
FIG. 2B is a block diagram illustrating a processor core, which may reside on a computer according to one or more of disclosed embodiments.

Referring now to FIG. 2B, a processing unit core 210 is illustrated in further detail, according to one embodiment. Processing unit core 210 may be the core for any type of processor, such as a micro-processor, an embedded processor, a digital signal processor (DSP), a network processor. or other device to execute code. Although only one processing unit core 210 is illustrated in FIG. 2B, a processing element may alternatively include more than one of the processing unit core 210 illustrated in FIG. 2B. Processing unit core 210 may be a single-threaded core or, for at least one embodiment, the processing unit core 210 may be multithreaded, in that, it may include more than one hardware thread context (or "logical processor") per core.

FIG. 2B also illustrates a memory 215 coupled to the processing unit core 210. The memory 215 may be any of a wide variety of memories (including various layers of memory hierarchy), as are known or otherwise available to those of skill in the art. The memory 215 may include one or more code instruction(s) 250 to be executed by the processing unit core 210. The processing unit core 210 follows a program sequence of instructions indicated by the code 250. Each instruction enters a front end portion 260 and is processed by one or more decoders 270. The decoder may generate as its output a micro operation such as a fixed width micro operation in a predefined format, or may generate other instructions, microinstructions, or control signals which reflect the original code instruction. The front end 260 may also include register renaming logic 262 and scheduling logic 264, which generally allocate resources and queue the operation corresponding to the convert instruction for execution.

The processing unit core 210 is shown including execution logic 280 having a set of execution units 285-1 through 285-N. Some embodiments may include a number of execution units dedicated to specific functions or sets of functions. Other embodiments may include only one execution unit or one execution unit that can perform a particular function. The execution logic 280 performs the operations specified by code instructions.

After completion of execution of the operations specified by the code instructions, back end logic 290 retires the instructions of the code 250. In one embodiment, the processing unit core 210 allows out of order execution but requires in order retirement of instructions. Retirement logic 295 may take a variety of forms as known to those of skill in the art (e.g., re-order buffers or the like). In this manner, the processing unit core 210 is transformed during execution of the code 250, at least in terms of the output generated by the decoder, the hardware registers and tables utilized by the register renaming logic 262, and any registers (not shown) modified by the execution logic 280.

Although not illustrated in FIG. 2B, a processing element may include other elements on chip with the processing unit core 210. For example, a processing element may include memory control logic along with the processing unit core 210. The processing element may include I/O control logic and/or may include I/O control logic integrated with memory control logic. The processing element may also include one or more caches.

Signal Strength Prediction Scheme

Figure 3A:
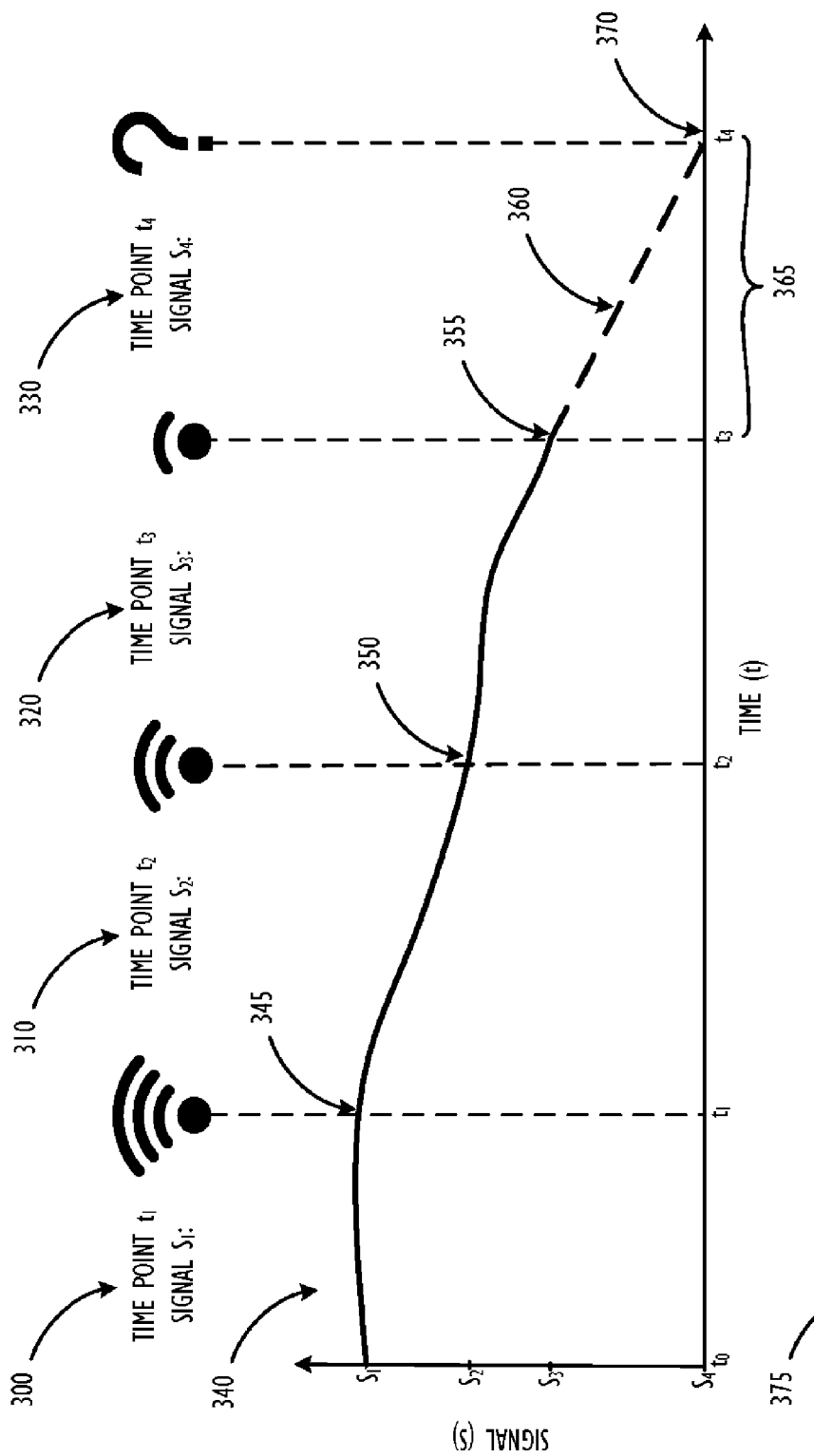
FIG. 3A shows a symbolic representation of signal strength as it may vary over time, according to one or more disclosed embodiments.
Figure 3B:
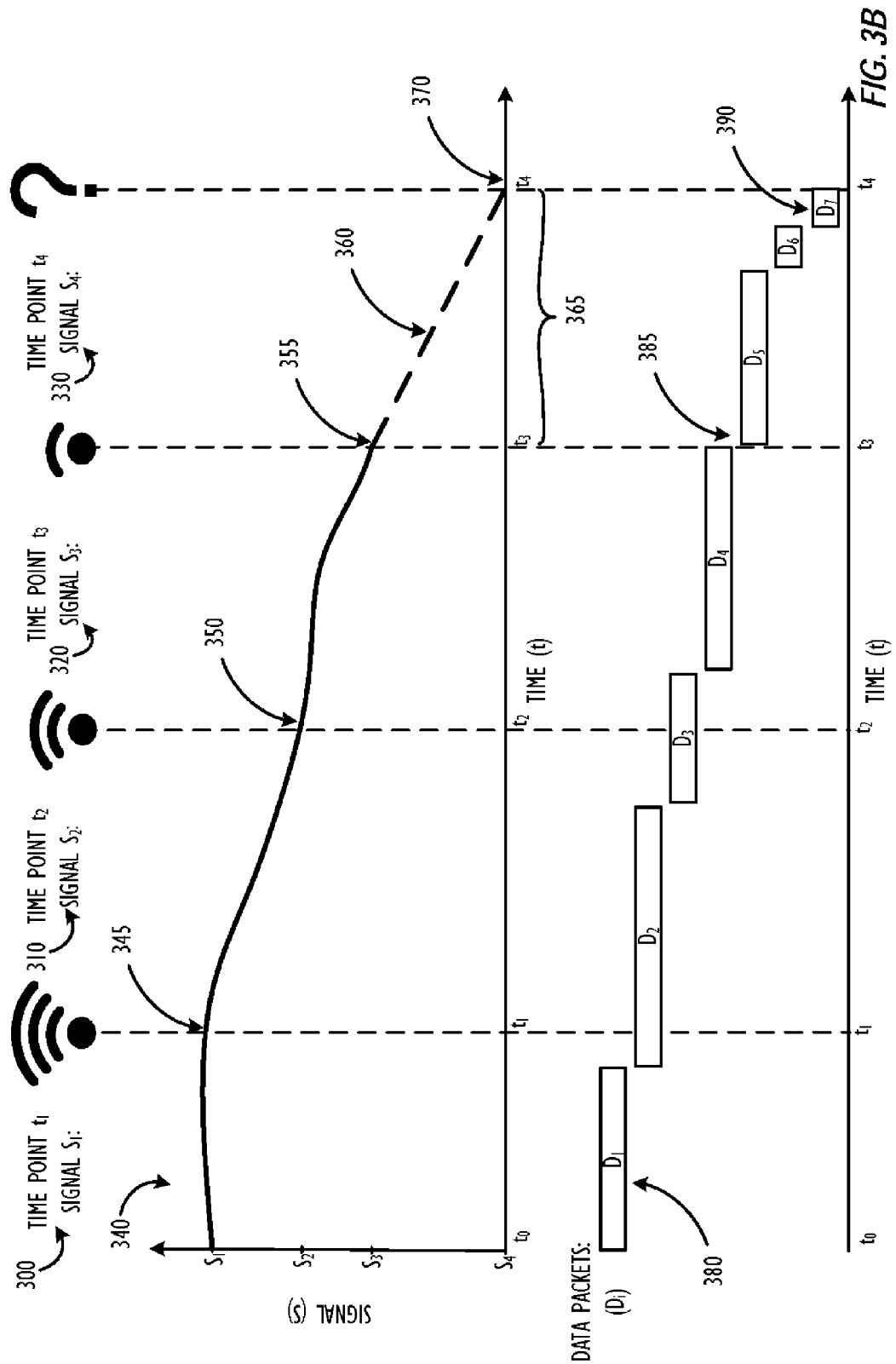
FIG. 3B shows a symbolic representation of data packets that may be transmitted as signal strength varies over time, according to one or more disclosed embodiments.

FIGS. 3A and 3B show one embodiment of a signal strength prediction scheme that may be used to optimize communications between mobile devices and/or embedded devices. Referring now to FIG. 3A, a symbolic representation of signal strength as it may vary over time is shown, according to one or more disclosed embodiments. In the exemplary embodiment of FIG. 3A, at time point the signal strength is shown as being a value, $S_1$ (300). Likewise, at time point $t_2$, the signal strength is shown as being a value, S2 (310). Finally, at time point $t_3$, the signal strength is shown as being a value, $S_3$ (320). In the example shown in FIG. 3A, time $t_3$ is the "current time." Time point $t_4$, represents a predicted time in the future at which point the signal strength, $S_4$, is predicted to fall off, thereby causing a connectivity interruption (330).

Graph 340 plots the signal strength (5) along the y-axis against time (t) on the x-axis of the graph. In graph 340, the signal strength, S, is showing as dropping off over time from value $S_1$ (345) to value $S_2$ (350) to value $S_3$ (355). This is mirrored by the diminishing signal strength icons above the corresponding positions on the graph. As mentioned above, in the example shown in FIG. 3A, time $t_3$ is the "current time." Therefore, times on the graph to the right of $t_3$, indicated by time region 365 represent estimations of the predicted. signal strength into the future. Line segment 360 changes from a solid line to a dashed line to indicate that these signal strengths are predicted, i.e., future, signal strengths. Value $S_4$ (370) represents the point at which the signal strength is predicted to drop to such a level that the connection will be interrupted, i.e., the signal will be dropped. The icon above the $t_4$ position on the graph is a question mark, rather than a signal strength icon, to reflect the fact that the signal strength at time $t_4$ is a prediction, and could turn out to be incorrect, e.g., if the user stops moving farther away from the device it is communicating with or moves away from some object that was causing interference in the signal.

As mentioned above, according to some embodiments, the communications optimization scheme may attempt to predict the timeframe before an Internet connection is likely to be lost. Naturally, any kind of predictive logic can be applied to predict the line segment 360. For example, the prediction can be based on linear approximation, polynomial, splines, or any other predictive mathematical model. It can also take into account the precision of $S_1$, $S_2$, $S_3$, $S_4$ measurements (e.g., using a standard deviation if multiple measurements were taken at or near time points $t_1$, $t_2$, $t_3$, $t_4$). According to some such embodiments, a primary factor in the predictions may be the rate at which the signal is dropping. The duration of the remaining "window of opportunity" may be estimated, and transmissions may be selected and/or tailored to complete before the expected connectivity loss. Further according to such embodiments, the rates of signal loss, R, and an average rate, $R_{average}$, may also be computed. According to sonic such embodiments, the equation to calculate the instantaneous rate of signal loss may be the equation shown in FIG. 3A at element 375 and reproduced as Equation 1 below.

$$R_i = |S_i - S_{i+1}| / |t_{i+1} - t_i| \quad \text{(Eqn. 1)}$$

From the rate of signal loss (or, more preferably, an average rate of signal loss, $R_{average}$), an expected time window before signal loss occurs may also be computed. Signal loss, $S_{loss}$, is considered the time when S=0 (i.e., when the connection drops).

According to some embodiments, the expected time window before signal loss may be calculated according to Equation 2 below.

$$t_{expected\_time\_window} = S_{last} / R_{average}, \text{ where } S_{last} \text{ is the last non-zero signal} \quad \text{(Eqn. 2)}$$

Referring now to FIG. 3B, a symbolic representation of data packets 380 that may be transmitted as signal strength varies over time is shown, according to one or more disclosed embodiments. As depicted in FIG. 3B, the data packets, $D_i$, 380 are aligned along the common time axis, t, which the signal strength is plotted against. As mentioned above with reference to FIG. 3A, time $t_3$ is the "current time." In the example shown, the rate of signal loss prior to time $t_3$ was within an "allowed margin," i.e., it was below a threshold signal strength loss rate, above which the scheme would begin to specially select and/or package data for transmission before an expected signal loss. This is represented by the varying size data packets, $D_1$-$D_4$ (where longer data packet bars represent larger data packets), transmitted between times $t_0$ and $t_3$. In other words, no special considerations were made by the scheme between times $t_0$ and $t_3$ with regard to selecting suitable data to complete transmission before an expected connectivity loss. After time $t_3$, however, the rate of signal loss was no longer within the "allowed margin," so the scheme began to select suitable data to complete transmission before the predicted expected connectivity loss. This is represented by the data packets, $D_5$-$D_7$ transmitted between times $t_3$ and $t_4$, wherein data packets D6 and D7 390 have been selected, packaged and/or prioritized to be transmitted before the expected signal loss at time $t_4$. By selecting data packets that are more likely to be able to be completely transmitted before the expected signal loss, the scheme may reduce the risk of interrupted transmissions and thus reduce the number of data packets that need to be re-sent.

Connectivity History Store

In addition to the above disclosed techniques regarding the signal strength prediction scheme, historical user connectivity data may also be mined and leveraged in order to strengthen predictions regarding expected signal loss. For example, human beings are creatures of habit and may connect to the same work Wi-Fi network at around the same time each day, e.g., when they leave for lunch or leave for home in the evening. Thus, it is possible to predict these signal drops if the scheme is able to "remember," e.g., via the use of a connectivity history store, when previous disconnections have frequently occurred. If these connections/disconnections are further correlated with particular access points that are routinely associated with such connections and disconnections, the connectivity history store may be further leveraged to help the scheme better predict the rate of the deterioration of signal strength in the future. For example, signal deterioration around the end of the user's work day is more likely to be real signal loss rather than a random fluctuation in the signal reading.

Moreover, the likely duration of the signal interruption, e.g., as determined from the connectivity history store, may also be taken into account in optimizing the transmission of certain data. For example, if leaving a particular Wi-Fi network always results in a quick reconnection (e.g., to a 3G 4G network or another Wi-Fi network), then telemetry information (which is typically smaller in size) may be sent first, and a suspected sample, e.g., a program that is potentially malware and which is typically larger in size, may be sent after reconnection. As an example, typical security-related telemetry information could include a cryptographic hash of a program, which may be accompanied by relevant meta-data describing the context (e.g., program name, package ID, publisher information, version, download event, program execution, copying, modification, etc.)

Device Movement Information

Drop in signal strength is not always attributable only to the movement of the user and the distance between the access point and the user's device. In the real world, there are always natural variations in signal strength caused by, e.g., interference, objects moving around, etc. The cause of a drop in signal strength can be further estimated using a positional sensor of the device, e.g., an accelerometer or gyrometer. Assuming that the access point a user's device is connected to is not moving, and the embedded device that is attempting to "dump" data to the user's device is not moving, then, in principle, all of the agents of the transmission session can be labeled as 'stationary' or 'mobile.' If the user's device is not reporting any movement, then, most likely, the change in signal strength can be discarded because it's likely due to random signal fluctuation and is not as likely to result in further signal strength drop.

However, if a positional sensor of the device confirms movement (and maybe comports with the device's history of movement recorded in the connectivity history store), then it's more likely that the scheme needs to pay attention to the diminishing signal strength, as it indicates the connection may soon be interrupted if the user's device continues to move at its current pace/trajectory. In such instances, this can trigger the scheme to estimate a remaining window of opportunity and begin to select suitable data to complete the transmission before the time of expected connectivity loss. In one embodiment, the scheme may simply apply Equations 1 and 2 above to determine an expected remaining time window for transmissions if the user's device is moving (and if it is confirmed that the device's positional sensor readings correspond to true movement and, therefore, that a signal disconnection will likely end up occurring), and not apply Equations 1 and 2 above if the device is not moving.

In some embodiments, more advanced machine learning techniques (e.g., support vector machine, neural network, decision tree, or decision forest techniques) may be employed to determine what movement/connectivity loss is significant and what movement/connectivity loss is not significant, in order to suit a particular application of the techniques disclosed herein. In such embodiment, the inputs for machine learning could include: timing, signal strength (on one or more connections if more than one is active, e.g. 3G and Wi-Fi at the same time), history, acceleration. GPS and/or coarse positioning, user identity, etc. The output of the machine learning could be a prediction about the timeframe available for transmission.

Prioritization

In some embodiments, certain data records may be prioritized over others during the "window of opportunity" before an expected connectivity loss. For example, during the transmission of suspicious samples and security telemetry, the most important security data (e.g., metadata or an actual sample) of suitable size may be sent before the connectivity is lost. Moreover, shorter data packets may be used in the window of opportunity, even though, normally, such data packets would result in unnecessary overhead.

If there are multiple incoming transmissions during a given connection, then the client devices can use HTTP HEAD (or a similar query) to determine the sizes of the various files that need to be downloaded, and then issue HTTP GET commands (or similar commands) for only those files, e.g., webpages, that will likely complete transfer before it is expected that the connectivity will be lost.

In still other embodiments, e.g., when collecting information from the so-called "Internet of Things," the scheme may prioritize security events, e.g., violations of door entrance policies (in the case of a 'smart' door) or more recent events, over other events that may pose less of an immediate threat to the device. The scheme may also construct a prioritized queue of what data it wants to send based on an application of the various rules discussed above, and then begin 'cutting up' the data in the queue based on how much time the scheme predicts that there is remaining for transmission.

Figure 4:
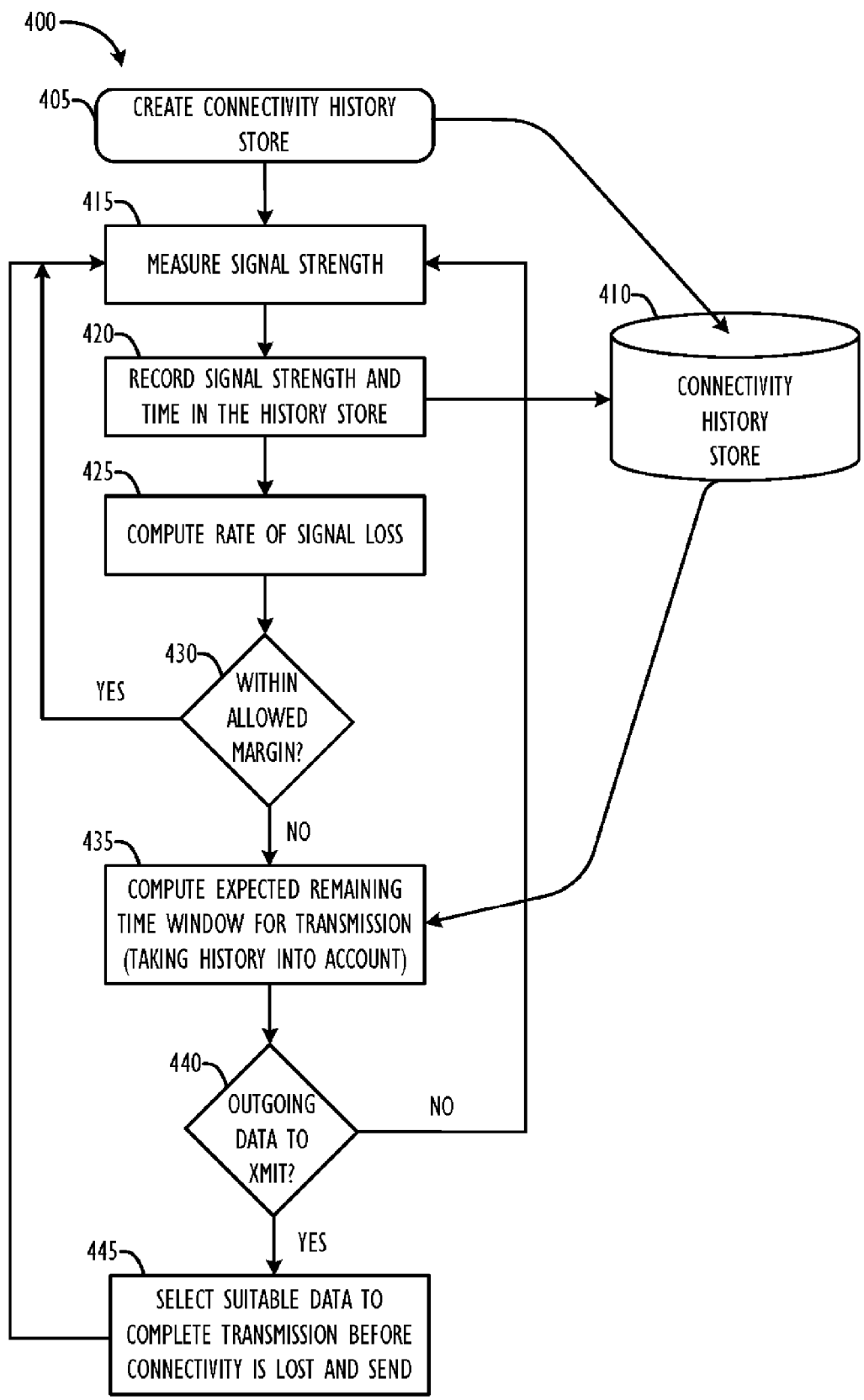
FIG. 4 is a flowchart of one embodiment of a method for optimizing communications for mobile and embedded devices.

FIG. 4 shows a flowchart 400 illustrating one embodiment of a method for optimizing communications for mobile and embedded devices. First the scheme may create a connectivity history store 410, e.g., having properties such as those as discussed above (405). Next, a measurement of the signal strength at the device may be taken (415). This signal strength may then be recorded, e.g., in the connectivity history store, and correlated with a time (and, optionally, an access point) associated with the measurement (420). Next, the rate of signal loss may be calculated, e.g., using Equations 1 and 2 above (425). If the rate of signal loss is within an allowed margin ('YES' at 430), the process may return to block 415 and continue to monitor the signal strength measurements. If, instead, the rate of signal loss is not within an allowed margin ('NO' at 430), the process may proceed to block 435 and estimate the expected remaining time window for data transmission. As discussed above, data from the connectivity history store (410) may also be leveraged in the estimation of the expected remaining time window for data transmission. For example, the time of day and/or type of network the user device is connected with may influence the estimation of expected remaining time window. If there is still remaining data for transmission ('YES' at 440), the process may then select suitable data to complete transmission before connectivity is expected to be lost, and send such selected data (445) and then return to block 415 to continue to monitor the signal strength measurements. If, instead, there is no remaining data for transmission ('NO' at 440), the process may return to block 415 and continue to monitor the signal strength measurements.

EXAMPLES

The following examples pertain to further embodiments. Example 1 is a non-transitory computer readable medium comprises computer executable instructions stored thereon to cause one or more processing units to receive a measurement of signal strength and a time associated with the measurement of signal strength; record the measurement of signal strength and the time associated with the measurement of signal strength in a connectivity history store; compute a rate of signal strength loss; determine that the rate of signal strength loss is not within an allowed margin; compute an expected remaining time window for data transmission; and select data for transmission, wherein the selected data is configured so that the transmission will be completed before the expected remaining time window expires; and direct the selected data to be sent to a desired recipient.

Example 2 includes the subject matter of example 1, wherein the instructions to compute a rate of signal strength loss further comprise instructions to compute an instantaneous rate of signal strength loss.

Example 3 includes the subject matter of example 1, wherein the instructions to compute a rate of signal strength loss further comprise instructions to compute an average rate of signal strength loss.

Example 4 includes the subject matter of example 1, wherein the instructions to determine that the rate of signal strength loss is not within an allowed margin further comprise instructions to compare the rate of signal strength loss to a threshold rate of signal strength loss.

Example 5 includes the subject matter of example 1, wherein the instructions to determine that the rate of signal strength loss is not within an allowed margin further comprise instructions to compare the rate of signal strength loss to a threshold rate of signal strength loss.

Example 6 includes the subject matter of example 1, wherein the instructions to select data for transmission to complete the transmission before the expected remaining time window expires further comprise instructions to select data packets having sizes configured to be transmitted within the expected remaining time window.

Example 7 includes the subject matter of example 1, wherein the instructions to select data for transmission to complete the transmission before the expected remaining time window expires further comprise instructions to select data packets based, at least in part, on a priority level of the data packet.

Example 8 includes the subject matter of example 1, wherein the instructions to compute an expected remaining time window for data transmission further comprise instructions to utilize relevant information from the connectivity history store.

Example 9 includes the subject matter of example 1, wherein the connectivity history store contains information about multiple devices.

Example 10 includes the subject matter of example 1, wherein the connectivity history store contains information about multiple access points, Example 11 includes the subject matter of example 1, wherein the information about the multiple devices is correlated with the information about multiple access points.

Example 12 is a non-transitory computer readable medium comprises computer executable instructions stored thereon to cause one or more processing units to receive a measurement of signal strength and a time associated with the measurement of signal strength; record the measurement of signal strength and the time associated with the measurement of signal strength in a connectivity history store; compute a rate of signal strength loss; correlate the computed rate of signal strength loss with rates of signal strength loss stored in the connectivity history store; determine that the rate of signal strength loss is consistent with the correlated rates of signal strength loss stored in the connectivity history store; determine that the rate of signal strength loss is not within an allowed margin; compute an expected remaining time window for data transmission; and select data for transmission, wherein the selected data is configured so that the transmission will be completed before the expected remaining time window expires; and direct the selected data to be sent to a desired recipient.

Example 13 includes the subject matter of example 12, wherein the instructions to compute an expected remaining time window for data transmission further comprise instructions to utilize relevant information from the connectivity history store.

Example 14 is a method for optimizing communications transmissions comprises receiving a measurement of signal strength and a time associated with the measurement of signal strength; computing a rate of signal strength loss; determining. that the rate of signal strength loss is not within an allowed margin; computing an expected remaining time window for data transmission; and selecting data for transmission, wherein the selected data is configured so that the transmission will be completed before the expected remaining time window expires; and directing the selected data to be sent to a desired recipient Example 15 includes the subject matter of example 14, wherein the act of computing a rate of signal strength loss further comprises computing an instantaneous rate of signal strength loss.

Example 16 includes the subject matter of example 14, wherein the act of computing a rate of signal strength loss further comprises computing an average rate of signal strength loss.

Example 17 includes the subject matter of example 14, wherein the act of determining that the rate of signal strength loss is not within an allowed margin further comprises comparing the rate of signal strength loss to a threshold rate of signal strength loss.

Example 18 includes the subject matter of example 14, wherein the act of selecting data for transmission to complete the transmission before the expected remaining time window expires further comprises selecting data packets having sizes configured to he transmitted within the expected remaining time window.

Example 19 includes the subject matter of example 14, wherein the act of selecting data for transmission to complete the transmission before the expected remaining time window expires further comprises selecting data packets based, at least in part, on a priority level of the data packet.

Example 20 includes the subject matter of example 14, wherein the act of computing an expected remaining time window for data transmission further comprise utilizing relevant information from a connectivity history store.

Example 21 includes the subject matter of example 14, wherein a non-transitory computer readable medium comprises computer executable instructions stored thereon to cause one or more processing units to perform a method as claimed in any of the preceding examples.

Example 22 is a method for optimizing communications transmissions receiving a measurement of signal strength and a time associated with the measurement of signal strength; recording the measurement of signal strength and the time associated with the measurement of signal strength in a connectivity history store; computing a rate of signal strength loss; correlating the computed rate of signal strength loss with rates of signal strength loss stored in the connectivity history store; determining that the rate of signal strength loss is consistent with the correlated rates of signal strength loss stored in the connectivity history store; determining that the rate of signal strength loss is not within an allowed margin; computing an expected remaining time window for data transmission; and selecting data for transmission, wherein the selected data is configured so that the transmission will be completed before the expected remaining time window expires; and directing the selected data to be sent to a desired recipient.

Example 23 includes the subject matter of example 22, wherein the act of selecting data for transmission to complete the transmission before the expected remaining time window expires further comprises selecting data packets based, at least in part, on a priority level of the data packet.

Example 24 includes the subject matter of example 22, wherein the act of computing an expected remaining time window for data transmission further comprises utilizing relevant information from the connectivity history store.

Example 25 includes the subject matter of example 22, wherein the method further comprises the act of correlating the computed rate of signal strength loss with rates of signal strength loss stored in the connectivity history store.

Example 26 includes the subject matter of example 22, wherein the method further comprises determining that the rate of signal strength loss is consistent with the correlated rates of signal strength loss stored in the connectivity history store.

Example 27 includes the subject matter of example 22, wherein the act, of determining that the rate of signal strength loss is consistent with the correlated rates of signal strength loss stored in the connectivity history store comprises analyzing information from a positional sensor of a device transmitting the selected data.

Example 28 is a non-transitory computer readable medium comprises computer executable instructions stored thereon to cause one or more processing units to perform a method of examples 22-27.

Example 29 is an apparatus comprises means to perform a method of examples 22-27.

Example 30 is a system is configured to optimize communications transmissions, comprising: a memory; and one or more processing units, communicatively coupled to the memory, wherein the memory stores instructions to configure the one or more processing units to: receive a measurement of signal strength and a time associated with the measurement of signal strength; record the measurement of signal strength and the time associated with the measurement of signal strength in a connectivity history store; compute a rate of signal strength loss; determine that the rate of signal strength loss is not within an allowed margin; compute an expected remaining time window for data transmission; and select data for transmission, wherein the selected data is configured so that the transmission be completed before the expected remaining time window expires; and direct the selected data to be sent to a desired recipient.

Example 31 includes the subject matter of example 30, wherein the instructions to select data for transmission to complete the transmission before the expected remaining time window expires further comprise instructions to select data packets based, at least in part, on a priority level of the data packet.

Example 32 includes the subject matter of example 30, wherein the instructions to compute an expected remaining time window for data transmission further comprise instructions to utilize relevant information from the connectivity history store.

Example 33 is an apparatus comprises: receiving means to receive a measurement of signal strength and a time associated with the measurement of signal strength; recording means to record the measurement of signal strength and the time associated with the measurement of signal strength in a connectivity history store; computing means to compute a rate of signal strength loss; correlating means to correlate the computed rate of signal strength loss with rates of signal strength loss stored in the connectivity history store; determining means to determine that the rate of signal strength loss is consistent with the correlated rates of signal strength loss stored in the connectivity history store; determining means to determine that the rate of signal strength loss is not within an allowed margin; computing means to compute an expected remaining time window for data transmission; and selecting means to select data for transmission, wherein the selected data is configured so that the transmission will be completed before the expected remaining time window expires; and directing means to direct the selected data to be sent to a desired recipient.

Example 34 includes the subject matter of example 33, wherein the computing means to compute an expected remaining time window for data transmission further comprise computing means to utilize relevant information from the connectivity history store.

Example 35 is an apparatus comprises: a memory; one or more processing units; and a non-transitory computer readable medium comprising computer executable instructions stored thereon to cause the one or more processing units to: receive a measurement of signal strength and a time associated with the measurement of signal strength; record the measurement of signal strength and the time associated with the measurement of signal strength in a connectivity history store; compute a rate of signal strength loss; determine that the rate of signal strength loss is not within an allowed margin; compute an expected remaining time window for data transmission; and select data for transmission, wherein the selected data is configured so that the transmission will be completed before the expected remaining time window expires; and direct the selected data to be sent to a desired recipient.

Example 36 includes the subject matter of example 35, wherein the instructions to compute a rate of signal strength loss further comprise instructions to compute an instantaneous rate of signal strength loss.

Example 37 includes the subject matter of example 35, wherein the instructions to compute a rate of signal strength loss further comprise instructions to compute an average rate of signal strength loss.

Example 38 includes the subject matter of example 35, wherein the instructions to determine that the rate of signal strength loss is not within an allowed margin further comprise instructions to compare the rate of signal strength loss to a threshold rate of signal strength loss.

Example 39 includes the subject matter of example 35, wherein the instructions to determine that the rate of signal strength loss is not within an allowed margin further comprise instructions to compare the rate of signal strength loss to a threshold rate of signal strength loss.

Example 40 includes the subject matter of example 35, wherein the instructions to select data for transmission to complete the transmission before the expected remaining time window expires further comprise instructions to select data packets based, at least in part, on a priority level of the data packet.

Example 41 includes the subject matter of example 35, wherein the instructions to compute an expected remaining time window for data transmission further comprise instructions to utilize relevant information from the connectivity history store.

Example 42 includes the subject matter of example 35, wherein the connectivity history store contains information about multiple devices.

Example 43 includes the subject matter of example 35, wherein the connectivity history store contains information about multiple access points Example 44 includes the subject matter of example 35, wherein the information about the multiple devices is correlated with the information about multiple access points.

Example 45 is an apparatus comprises: a memory; one or more processing units; and a non-transitory computer readable medium comprising computer executable instructions stored thereon to cause the one or more processing units to: receive a measurement of signal strength and a time associated with the measurement of signal strength; record the measurement of signal strength and the time associated with the measurement of signal strength in a connectivity history store; compute a rate of signal strength loss; correlate the computed rate of signal strength loss with rates of signal strength loss stored in the connectivity history store; determine that the rate of signal strength loss is consistent with the correlated rates of signal strength loss stored in the connectivity history store; determine that the rate of signal strength loss is not within an allowed margin; compute an expected remaining time window for data transmission; and select data for transmission, wherein the selected data is configured so that the transmission will be completed before the expected remaining time window expires; and direct the selected data to be sent to a desired recipient.

Example 46 includes the subject matter of example 45, wherein the instructions to compute an expected remaining time window for data transmission further comprise instructions to utilize relevant information from the connectivity history store.

In the foregoing description, for purposes of explanation, numerous specific details are set forth in order to provide a thorough understanding of the disclosed embodiments. It will be apparent, however, to one skilled in the art that the disclosed embodiments may be practiced without these specific details. In other instances, structure and devices are shown in block diagram form in order to avoid obscuring the disclosed embodiments. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one disclosed embodiment, and multiple references to "one embodiment" or "an embodiment" should not be understood as necessarily all referring to the same embodiment.

It is also to be understood that the above description is intended to be illustrative, and not restrictive. For example, above-described embodiments may be used in combination with each other and illustrative process steps may be performed in an order different than shown. Many other embodiments will be apparent to those of skill in the art upon reviewing the above description. The scope of the invention therefore should be determined with reference to the appended claims, along with the full scope of equivalents to which such claims are entitled. In the appended claims, terms "including" and "in which" are used as plain-English equivalents of the respective terms "comprising" and "wherein."

What is claimed is:

1. A non-transitory computer readable medium comprising computer executable instructions stored thereon to cause one or more processing units to:
   receive a measurement of signal strength and a time associated with the measurement of signal strength;
   record the measurement of signal strength and the time associated with the measurement of signal strength in a connectivity history store;
   compute an instantaneous rate of signal strength loss;
   determine that the instantaneous rate of signal strength loss is not within an allowed margin;
   compute an expected remaining time window for data transmission;
   select data for transmission, wherein the selected data comprises data packets having sizes configured to be transmitted within the expected remaining time window; and
   direct the selected data to be sent to a desired recipient.

2. The non-transitory computer readable medium of claim 1, wherein the instructions to determine that the instantaneous rate of signal strength loss is not within the allowed margin further comprise instructions to compare the instantaneous rate of signal strength loss to a threshold rate of signal strength loss.

3. The non-transitory computer readable medium of claim 1, wherein the instructions to select the data for transmission further comprise instructions to select the data packets based, at least, on a priority level of the data packets.

4. The non-transitory computer readable medium of claim 1, wherein the instructions to compute the expected remaining time window for data transmission further comprise instructions to utilize relevant information from the connectivity history store.

5. The non-transitory computer readable medium of claim 4, wherein the connectivity history store contains information about multiple devices.

6. The non-transitory computer readable medium of claim 5, wherein the connectivity history store contains information about multiple access points.

7. The non-transitory computer readable medium of claim 6, wherein the information about the multiple devices is correlated with the information about multiple access points.

8. A non-transitory computer readable medium comprising computer executable instructions stored thereon to cause one or more processing units to:
   receive a measurement of signal strength and a time associated with the measurement of signal strength;
   record the measurement of signal strength and the time associated with the measurement of signal strength in a connectivity history store;
   compute an average rate of signal strength loss;
   correlate the computed average rate of signal strength loss with rates of signal strength loss stored in the connectivity history store;
   determine that the average rate of signal strength loss is consistent with the correlated rates of signal strength loss stored in the connectivity history store;
   determine that the average rate of signal strength loss is not within an allowed margin;
   compute an expected remaining time window for data transmission;
   select data for transmission, wherein the selected data comprises data packets selected based, at least in part, on a priority level of the data packets; and
   direct the selected data to be sent to a desired recipient.

9. The non-transitory computer readable medium of claim 8, wherein the selected data further comprises the data packets having sizes configured to be transmitted within the expected remaining time window.

10. The non-transitory computer readable medium of claim 8, wherein the instructions to compute the expected remaining time window for data transmission further comprise instructions to utilize relevant information from the connectivity history store.

11. A method of optimizing communications transmissions, comprising:
receiving a measurement of signal strength and a time associated with the measurement of signal strength;
computing an instantaneous rate of signal strength loss;
determining that the instantaneous rate of signal strength loss is not within an allowed margin;
computing an expected remaining time window for data transmission;
selecting data for transmission, wherein the selected data comprises data packets select bases, at least in part, on a priority level of the data packets; and
directing the selected data to be sent to a desired recipient.

12. The method of claim 11, wherein the act of determining that the instantaneous rate of signal strength loss is not within the allowed margin further comprises comparing the instantaneous rate of signal strength loss to a threshold rate of signal strength loss.

13. The method of claim 11, wherein the act of selecting the data for transmission further comprises selecting the data packets having sizes configured to be transmitted within the expected remaining time window.

14. The method of claim 11, wherein the act of computing the expected remaining time window for data transmission further comprise utilizing relevant information from a connectivity history store.

15. A method of optimizing communications transmissions, comprising:
receiving a measurement of signal strength and a time associated with the measurement of signal strength;
recording the measurement of signal strength and the time associated with the measurement of signal strength in a connectivity history store;
computing an average rate of signal strength loss;
correlating the computed average rate of signal strength loss with rates of signal strength loss stored in the connectivity history store;
determining that the average rate of signal strength loss is consistent with the correlated rates of signal strength loss stored in the connectivity history store;
determining that the average rate of signal strength loss is not within an allowed margin;
computing an expected remaining time window for data transmission;
selecting data for transmission, wherein the selected data comprises data packets having sizes configured to be transmitted within the expected remaining time window; and
directing the selected data to be sent to a desired recipient.

16. The method of claim 15, wherein the act of selecting the data for transmission further comprises selecting the data packets based, at least, on a priority level of the data packets.

17. The method of claim 15, wherein the act of computing the expected remaining time window for data transmission further comprises utilizing relevant information from the connectivity history store.

18. A system configured to optimize communications transmissions, comprising:
a memory; and
one or more processing units, communicatively coupled to the memory, wherein the memory stores instructions to configure the one or more processing units to:
receive a measurement of signal strength and a time associated with the measurement of signal strength;
record the measurement of signal strength and the time associated with the measurement of signal strength in a connectivity history store;
compute an average rate of signal strength loss;
determine that the average rate of signal strength loss is not within an allowed margin;
compute an expected remaining time window for data transmission;
select data for transmission, wherein the selected data comprises data packets having sizes configured to be transmitted within the expected remaining time window; and
direct the selected data to be sent to a desired recipient.

19. The system of claim 18, wherein the instructions to select the data for transmission further comprise instructions to select the data packets based, at least, on a priority level of the data packets.

20. The system of claim 18, wherein the instructions to compute the expected remaining time window for data transmission further comprise instructions to utilize relevant information from the connectivity history store.

* * * * *